A. OLEVIN.
FRUIT AND VEGETABLE PEELING ATTACHMENT.
APPLICATION FILED JUNE 27, 1919.
1,347,288. Patented July 20, 1920.
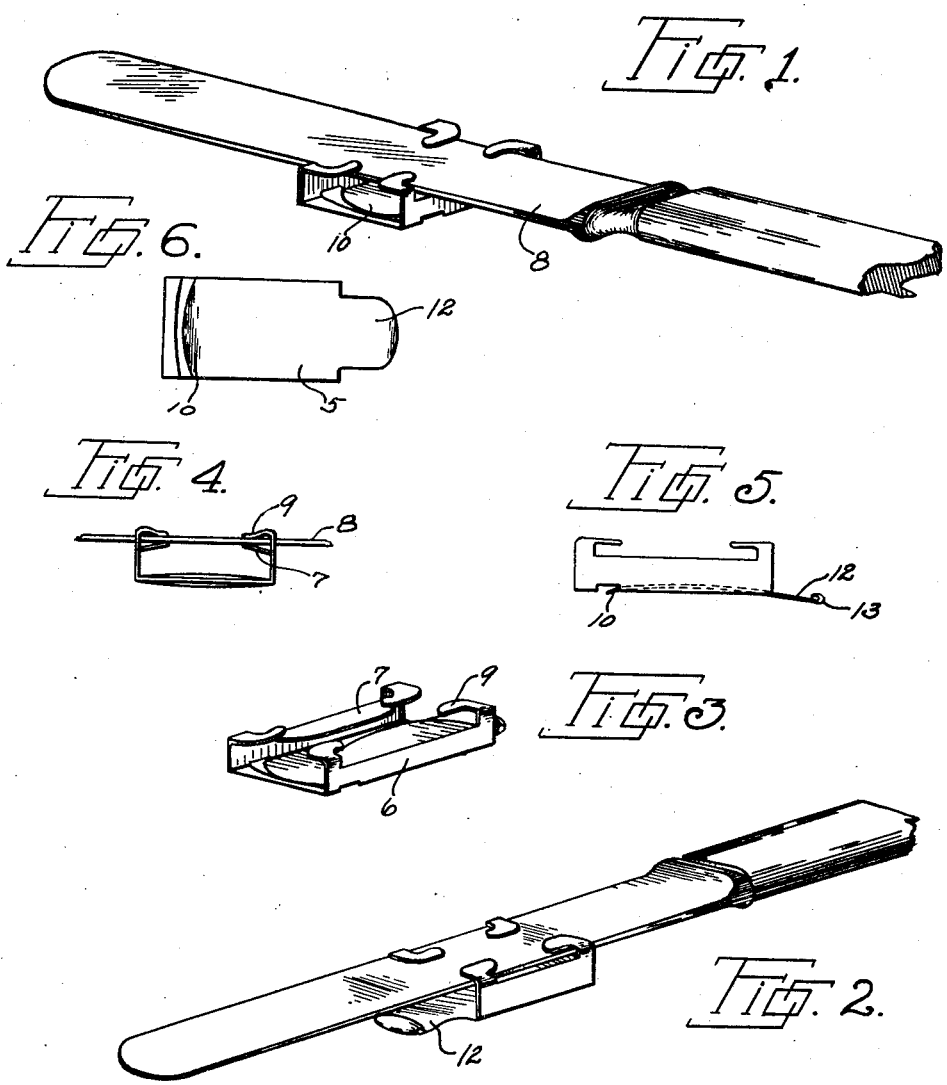

UNITED STATES PATENT OFFICE.

ADOLPH OLEVIN, OF DETROIT, MICHIGAN.

FRUIT AND VEGETABLE PEELING ATTACHMENT.

1,347,288.   Specification of Letters Patent.   Patented July 20, 1920.

Application filed June 27, 1919. Serial No. 307,081.

*To all whom it may concern:*

Be it known that I, ADOLPH OLEVIN, a citizen of the United States, residing at Detroit, in the county of Wayne and State of Michigan, have invented certain new and useful Improvements in Fruit and Vegetable Peeling Attachments, of which the following is a specification.

This invention relates to fruit and vegetable peeling attachments, and has for its object the provision of a fruit and vegetable peeler of small size and compact construction that can be conveniently kept in a small drawer, camp kit, etc., and which is arranged to be quickly mounted onto the blade of an ordinary table or kitchen knife when desired for use in peeling.

Another object of the invention is the provision of a plurality of peeling blades of varied shape and arranged to give cuts of different depth, the arrangement being such that any desired blade can be immediately placed in cutting position.

A further object is the provision of a peeling attachment of simple and inexpensive construction which will be efficient and durable in use and easily maintained in clean and sanitary condition.

With the above and other objects in view which will readily appear as the invention is better understood, my invention consists in the novel construction, combination and arrangement of parts to be hereinafter more fully described and particularly pointed out in the appended claims.

Reference is to be had to the accompanying drawings illustrating a preferred embodiment of my invention and wherein similar reference numerals designate similar parts throughout the several views.

In the drawings:—

Figure 1 is a perspective view of my improved peeling attachment in position for use in peeling fruits or vegetables with thin skins, the attachment being mounted transversely of the knife blade;

Fig. 2 is a similar view with the attachment in position for peeling fruits or vegetables with thick skins, the attachment being mounted parallel with the knife blade;

Fig. 3 is a perspective view of the peeling attachment detached from the knife blade;

Fig. 4 is an end elevation of the attachment, with a portion of the knife blade shown;

Fig. 5 is a side elevation of the attachment; and

Fig. 6 is a bottom plan view thereof.

Referring to the drawings, my peeling attachment is shown as formed with a bottom portion 5, parallel side portions 6 and inturned upper portions 7 adapted to engage the under side of an ordinary table or kitchen knife 8 when in position for use in peeling vegetables, fruits, etc. The attachment is clamped in position upon the knife blade through the pressure exerted by spring clips or fingers 9, herein shown as extending from the opposite ends of the side pieces 6 and bent inwardly and downwardly to a position that will frictionally engage a knife blade of ordinary thickness, the material of which the clips are formed being of sufficient elasticity to firmly grip the upper face of the knife blade and force the blade firmly against the upper portion 7 of the peeling attachment. The blade engaging portions of the spring fingers 9 are so spaced and arranged relatively to the body portion that a knife blade can be passed either transversely of the peeling attachment, as shown in Fig. 1, or longitudinally thereof, as shown in Fig. 2, all four of the spring fingers engaging the knife blade in either position. Also, the upper portions 7 are preferably so formed that they exert a spring pressure against the under side of the knife blade to aid in firmly holding the attachment in position.

The embodiment herein illustrated is provided with two cutting blades, one of which is arranged transversely across the bottom portion 5, as at 10, and is preferably curved downwardly to a short distance below the remainder of the portion 5. This cutting blade 10 is herein shown as formed as an integral part of the portion 7, suitably bent and sharpened, but it is to be understood that a detachable blade could be secured in position if desired. The blade 10 is preferably positioned so as to cut only a very thin slice, and is particularly useful in removing the peelings from potatoes, apples, or like fruits or vegetables with thin skins.

To use this blade 10 the peeling attachment is arranged transversely of the knife blade substantially as shown in Fig. 1, and the knife blade is held in one hand and the article to be peeled in the other, the article being placed so as to contact with the bottom portion 5 of the peeling attachment.

The blade 10 will embed into the article to the depth desired, and by moving the knife blade or the article, the peeling will be removed and passed through the peeling attachment directly beneath the knife blade. To aid in the removal of the thin peelings, the bottom portion of the attachment is preferably bent upwardly, substantially as shown in dotted lines in Fig. 5, in this manner providing a slanting wall that guides the peeling after it is removed from the article.

A cutting blade for removing peelings from thicker skinned fruits or vegetables is arranged at one extremity of the bottom portion, substantially as shown at 12 in Figs. 2 and 5, this portion being preferably an extension of the bottom portion suitably bent downwardly therefrom so as to embed into the fruit or vegetable to the depth desired. The cutting blade is preferably arranged in two portions, at either side of a central blunt portion 13, which is herein shown as a rounded end portion formed by bending back on itself the extended edge. This arrangement provides a rounded or blunt portion adapted to engage the fruit or vegetable during the peeling operation so as to prevent the blade digging or cutting too deeply into the fruit or vegetable, while at either side of this rounded portion the cutting blades sever the peelings from the fruit itself. When it is desired to use this cutting blade 12 the peeling attachment is slipped over the knife blade, substantially as shown in Fig. 2, and the cutting portion 12 is forced through the skin of an orange, for example, until the rounded portion 13 engages with the fruit itself. The orange is then rotated, or the knife blade is moved and the orange held stationary, the result being that a strip of orange peel is removed of the width of the cutting portion 12. In this manner the entire peeling can be removed, or, after a central strip has been removed, the remaining portion of the peel can be easily removed without the aid of the peeling attachment.

While it will be apparent that the illustrated embodiment of my invention herein disclosed is well calculated to adequately fulfil the objects primarily stated, it is to be understood that the invention is susceptible to variation, modification and change without departing from the spirit and scope of the invention as set forth in the subjoined claims.

Having described my invention, I claim:

1. A device of the character described having a plurality of peeling blades, with means for securing the device upon a knife blade either transversely or longitudinally thereof, whereby any desired peeling blade can be brought into position for use.

2. A device of the character described having a body portion on which is mounted a plurality of peeling blades and a plurality of elastic fingers adapted to engage a knife blade.

3. A device of the character described having a body portion formed on one extremity with a bottom portion on which is mounted a plurality of cutting blades and on its other extremity a plurality of elastic fingers adapted to grip a knife blade.

4. A device of the character described having a body portion on which is mounted a plurality of peeling blades and a plurality of elastic fingers adapted to engage a knife blade, the fingers being so arranged and spaced from the body portion as to permit the insertion of the knife blade either longitudinally or transversely of the device.

5. A device of the character described having a body portion formed with a bottom portion on which are secured peeling blades adapted to remove peelings of different thicknesses, and elastic fingers mounted on said body portion in position to engage a knife blade.

6. A device of the character described having a body portion formed with a bottom portion on which is mounted a cutting blade, side portions, and elastic fingers extending from the side portions a sufficient distance to permit the passage of a knife blade between the side portions and the elastic fingers either longitudinally or transversely of the device.

ADOLPH OLEVIN.

Witnesses:
MARY KENNEDY,
JOHN C. ALEXANDER.